July 19, 1960

H. BRIDEN 2,945,384

MECHANISMS FOR PRODUCING ROTATIONAL MOVEMENT OF A
MASS ABOUT AN AXIS WITH A PERIODIC REVERSAL
OF THE DIRECTION OF ROTATION

Filed Sept. 25, 1957

INVENTOR
HORACE BRIDEN
ATTORNEYS 2,945,384

MECHANISMS FOR PRODUCING ROTATIONAL MOVEMENT OF A MASS ABOUT AN AXIS WITH A PERIODIC REVERSAL OF THE DIRECTION OF ROTATION

Horace Briden, Kingsbury, London, England, assignor to The General Electric Company Limited, London, England Filed Sept. 25, 1957, Ser. No. 686,167

Claims priority, application Great Britain Sept. 27, 1957

10 Claims. (Cl. 74—25)

The present invention relates to mechanisms for producing rotational movement of a mass about an axis with a periodic reversal of the direction of rotation.

One object of the present invention is to provide a mechanism that will drive a mass, which may be a radar reflector, through a given arc at a substantially uniform angular velocity and cause the direction of travel to be reversed at the completion of each arc, the reversal taking place in a relatively small interval of time.

According to the present invention a mechanism for producing rotational movement of a mass about an axis with a periodic reversal of the direction of rotation comprises an arm which is arranged to support a mass and which is mounted for rotation so as to enable the said mass to swing to and fro in an arc of a circle, a source of power for driving the said arm through a clutch device which is arranged so that the said arm can be driven by the said source of power in either direction, means arranged to operate the said clutch device to disconnect the drive to the said arm before the completion of each swing, a spring which is arranged to store at least the major part of the kinetic energy of the said arm and the said mass as strain energy in the spring when the said means arranged to disconnect the drive from the said source of power to the said arm has operated, the subsequent release of this strain energy of the said spring causing the said arm and the said mass to start to swing back in the reverse direction, and means arranged to reoperate the said clutch device after such a reversal to reconnect the drive to the said arm in the opposite direction.

Preferably the arc of a circle in which the said arm is arranged to swing lies in a horizontal plane. This arc of a circle in which the said arm is arranged to swing may be greater than 30° and less than 300°. The said means arranged to disconnect the drive from the said source of power to the said arm may operate when the said arm is approximately 5° from the extreme position of swing and is moving towards that position, whilst the said means arranged to reconnect the drive from the said source of power to the said arm may operate when the said arm is approximately 5° from the extreme position of swing and is moving away from that position.

Preferably the said spring which is arranged to store at least the major part of the kinetic energy of the said arm and the said mass is a torsion bar which may be formed of a titanium alloy or steel. The said mass may be a radar reflector.

One example of a mechanism for producing rotational movement of a mass about an axis with a periodic reversal of the direction of rotation in accordance with the present invention will now be described by way of example with reference to the accompanying drawings in which.

Figure 1:
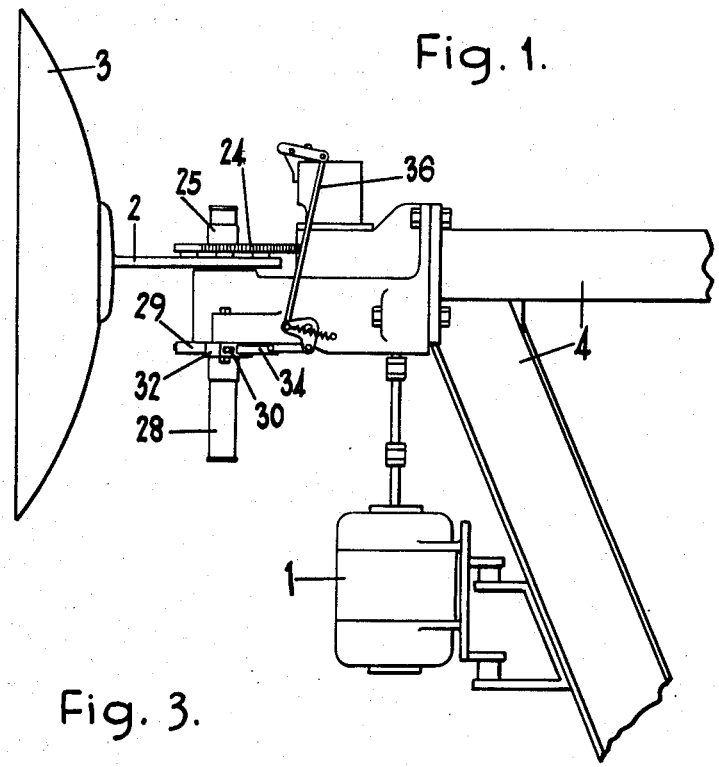
Figure 1 shows a side elevation of the mechanism.

Referring now to Figure 1 of the drawing for a brief description of the mechanism, it comprises an electric motor 1 that is arranged to drive an arm 2, on the outer end of which a mass which in the present example is taken to be a radar reflector 3 is mounted, through an arc of 136° in a horizontal plane. The mechanism is mounted on a suitable framework, only a part 4 of which is shown. The arm 2 is arranged to be swung to and fro in the arc at a substantially uniform speed and at the end of each swing the direction of movement is reversed, the reversal taking place in a short interval of time. Immediately prior to each reversal the drive from the electric motor 1 to the swinging arm 2 is interrupted and at least the major part of the kinetic energy of the swinging arm 2 and the radar reflector 3 is stored as strain energy in a torsion bar 27, the subsequent release of the energy in the torsion bar 27 causing the swinging arm 2 to start to swing back in the opposite direction, the drive from the electric motor 1 being reconnected shortly after the reversal is complete. The mechanism is arranged to give a high rate of swing and of reversal so that the radar reflector 3 is swung through a total angular distance of the order of 1000° in each second. The electric motor 1 employed may be non-reversible and of comparatively low power. It has been found that some 200 watts are required to drive a radar reflector of 30 inches diameter.

Figure 2:
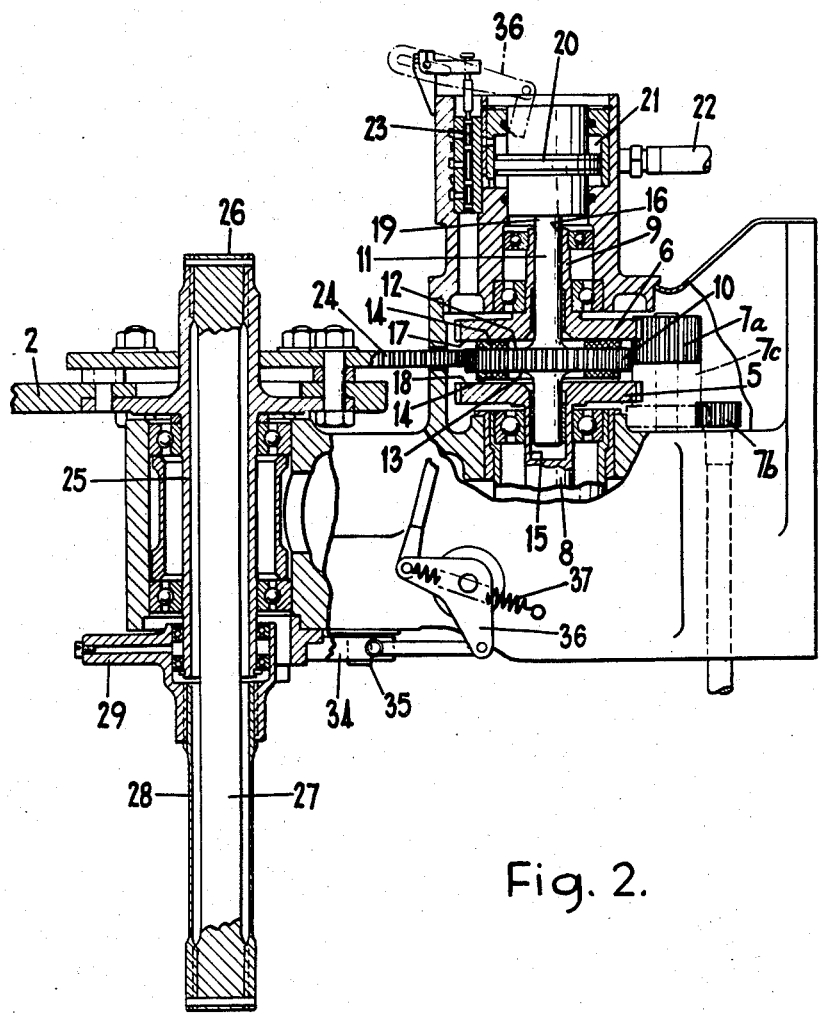
Figure 2 shows an enlarged part-sectional side elevation of the mechanism.

The mechanism will now be described in more detail with reference to Figure 2 of the drawing. A pair of gear wheels 5 and 6 of equal size are arranged to be driven by the electric motor 1, through suitable gearing 7a, 7b and 7c, at the same speed in opposite directions. The pair of gear wheels 5 and 6 are arranged a short distance apart with their shafts 8 and 9 respectively collinear and vertical.

In the space between the pair of gear wheels is arranged a third gear wheel 10 of approximately the same size as the pair of gear wheels 5 and 6, the shaft 11 of the third gear wheel 10 being collinear with the axes of the pair of gear wheels 5 and 6. Both plane surfaces 12 and 13 of the third gear wheel 10 are covered with a frictional material 14 such as is used for clutch and brake linings.

The shafts 8 and 9 of the pair of gear wheels 5 and 6 are provided with axial holes 15 and 16 respectively through which passes the shaft 11 of the third gear wheel 10. The distance between the pair of gear wheels 5 and 6 is arranged to be slightly greater than the width of the third gear wheel 10 so that the latter is permitted a small vertical travel. When at the upper limit of its travel the frictional material 14 on the upper surface 12 of the third gear wheel 10 will be pressed into contact with the lower surface 17 of the upper gear wheel 6 of the pair whilst, when at the lower limit of its travel, the frictional material 14 on the lower surface 13 of the third gear wheel 10 will be pressed into contact with the upper surface 18 of the lower gear wheel 5 of the pair. When in contact with one of the gear wheels 5 or 6 of the pair the third gear wheel 10 will, due to the layer of frictional material 14, be driven at the same speed and in the same direction as the gear wheel 5 or 6 with which it is in contact.

The upper end 19 of the shaft 11 of the third gear wheel 10 is connected to a piston 20 that moves in a vertical cylinder 21, the connection is axiably rigid but the arrangement is such that the third gear wheel 10 is free to rotate. The piston 20 is actuated by oil under pressure that is fed through pressure tubing 22 from an oil reservoir (not shown), the oil being admitted to the cylinder 21 through a valve 23. The oil may be admitted to the cylinder 21 either above or below the piston 20 so that the piston 20 may be driven either upwards or downwards, actuation of the valve 23 causing the supply of oil to be diverted from one side of the piston 20 to the other. The distance that the piston 20 is able to travel in the cylinder 21 is such that when oil is admitted below the piston 20 the third gear wheel 10 is pressed into contact with the upper gear wheel 6 of the pair whilst when oil is admitted to the cylinder 21 above the piston 20 the third gear wheel 10 is pressed into contact with the lower gear wheel 5 of the pair.

The teeth of the third gear wheel 10 engage with teeth in the curved periphery of a substantially flat member 24 in the shape of a sector of a circle having a sectorial angle of some 140° (this member 24 is hereinafter referred to as the sectorial member 24). Bolted to the sectorial member 24 is the swinging arm 2, the outer end of which carries the radar reflector 3 (not shown in this figure) that is to be driven, the axis of the arm 2 bisecting the sectorial angle of, and lying parallel to, the plane of the sectorial member 24. The sectorial member 24 together with the swinging arm 2 are bolted to a hollow cylindrical member 25 the axis of which is vertical and passes through the apex of the sectorial member 24. The hollow cylindrical member 25 is mounted so that it is free to rotate about its axis, such rotation causing the sectorial member 24 and the swinging arm 2 to rotate in a horizontal plane, this rotation is limited to some 70° on either side of the mean position since the sectorial angle of the sectorial member 24 is some 140°.

The hollow cylindrical member 25 is closed by a member 26 at its upper end, a cylindrical torsion bar 27 of slightly smaller diameter than the inside diameter of the hollow cylindrical member 25 being rigidly attached to the inside of the hollow cylindrical member 25 at their upper ends only. The lower end of the torsion bar 27 projects through the open end of the hollow cylindrical member 25 into a further hollow cylindrical member 28 of the same internal diameter as the hollow cylindrical member 25 and co-axial with it. The further hollow cylindrical member 28 is also free to rotate about its axis and the torsion bar 27 is rigidly attached to the inside of the further hollow cylindrical member 28 at their lower ends only.

Rigidly attached to the upper end of the further hollow cylindrical member 28 is a short arm 29 that projects with its axis parallel to the axis of the swinging arm 2. Since the hollow cylindrical member 25 and the further hollow cylindrical member 28 are connected by means of the torsion bar 27 rotation of the hollow cylindrical member 25 causes the further hollow cylindrical member 28 to rotate also.

Figure 3:
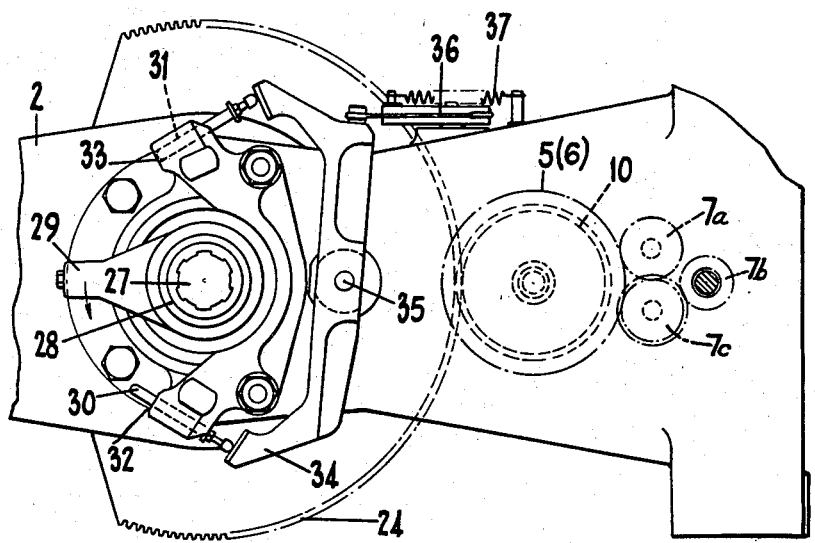
Figure 3 shows an underneath plan of the mechanism.

Referring now to Figure 3 of the drawings, when the system has been rotated some 50° from the mean position in either direction the short arm 29 that projects from the further hollow cylindrical member 28 comes into contact with one or other of two small horizontal tappets 30 or 31 that project through stops 32 or 33 respectively mounted one on either side of the mean position. The tappets 30 and 31 are arranged to displace one or other end of a rocker arm 34 that is pivoted at its centre point 35 and free to rock in a horizontal plane. A linkage mechanism 36 is connected to the rocker arm 34 to actuate the valve 23 that controls the supply of oil to the cylinder 21 as previously described. A spring mechanism 37 co-operating with the linkage mechanism 36 causes the rocker arm 34, when displaced, to remain in one extreme position until caused to rock to the other extreme position by one of the tappets 30 or 31.

Referring again to Figure 2 of the drawings, if it is supposed that at a certain time the third gear wheel 10 is being pressed into contact with the lower gear wheel 5 of the pair of gear wheels 5 and 6 and is therefore causing the sectorial member 24 and thus the swinging arm 2 on which the radar reflector 3 is mounted to be driven in a given direction. And further, if at the given instant considered the system is in the mean position, the sequence of operation will be as follows.

The rotation of the radar reflector 3 will continue until the swinging arm 2 carrying the radar reflector 3 makes an angle of 50° with its mean position. At this point the short arm 29 on the upper end of the further hollow cylindrical member 28 comes into contact with one of the tappets 30 or 31 which, as it is pressed back, causes the rocker arm 34 to be displaced from one extreme position to the other. In being displaced the rocker arm 34 acts through the linkage mechanism 36 to actuate the valve 23 controlling the oil supply so that the pressure acting in the cylinder 21 on the top face of the piston 20 is released causing the third gear wheel 10 to be disengaged from the lower gear wheel 5 of the pair.

Upon actuation of the valve 23 controlling the oil supply the pressure on the piston 20 will be released in a time that is dependent on the time that is taken by a shock wave to travel, in oil, the distance between the cylinder 21 and the oil reservoir (not shown) by way of the pressure tubing 22. Since the velocity of a shock wave in oil is of the order of 5000 feet per second the drive to the swinging arm 2 on which the radar reflector 3 is mounted will be interrupted a very short time, of the order of a millisecond, after the short arm 19 first causes actuation of the rocker arm 34 through striking one of the tappets 30 or 31.

Due to the momentum of the system the swinging arm 2 on which the radar reflector 3 is mounted will continue swinging but, when the short arm 29 projecting from the further hollow cylindrical member 28 comes into contact with one of the two stops 32 or 33 the upper end of the further hollow cylindrical member 28 will no longer be free to rotate. Since the lower end of the torsion bar 27 is rigidly attached to the further hollow cylindrical member 28, the swinging arm 2 and the radar reflector 3 mounted thereon will do work in twisting the torsion bar 27 and, to some extent, the further hollow cylindrical member 28 and consequently will quickly be brought to rest. The energy due to this twisting will then be released driving the swinging arm 2 on which the radar reflector 3 is mounted back in the opposite direction. The arrangement is such that this reversal in the direction of swing takes place some 68° from the mean position when the radar reflector 3 is being swung through a total angular distance of 1000° in each second.

In addition to releasing the pressure on the top face of the piston 20, actuation of the valve 23 as previously described will cause oil under pressure to be admitted to the cylinder 21 below the piston 20. This in turn will cause the third gear wheel 10 to be pressed up into contact with the lower surface 13 of the upper gear wheel 6 of the pair so that the swinging arm 2 carrying the radar reflector 3 is driven back in the opposite direction, through the mean position until 50° on the other side of the mean position. At this point the short arm 29 mounted on the further hollow cylindrical member 28 makes contact with the other tappet 30 or 31 and initiates a sequence of operations, similar to those described, which results in a reversal of the direction of swing once again.

The time taken for the third gear wheel 10 to move into contact with one gear wheel, say the gear wheel 6, of the pair after breaking contact with the other gear wheel, 5 say, of the pair is arranged to be slightly longer than the time taken by the torsion bar 27 to bring about the reversal in the direction of swing of the swinging arm 2 carrying the radar reflector 3. Thus the drive to the swinging arm 2 is not reconnected until the swinging arm 2 has started to swing back in the opposite direction after a reversal.

If a more exactly uniform rate of swing is required the time taken by the third gear 10 to move from contact with one gear wheel, say the gear wheel 6, of the pair, to contact with the other gear wheel, 5 say, of the pair may be made less than the time taken by the torsion bar 27 to bring about the reversal in the direction of swing of the swinging arm 2 carrying the radar reflector 3. In this case the electric motor 1 assists the torsion bar 27 to bring about the reversal and the initial rate of swing back after the reversal is more nearly equal to the required uniform rate of swing.

I claim:

1. A mechanism for producing rotational movement of a mass about an axis with a periodic reversal of the direction of rotation comprising an arm which is arranged to support a mass and which is mounted for rotation so as to enable the said mass to swing to and fro in an arc of a circle, a source of power for driving the said arm through a clutch device which is arranged so that the said arm can be driven by the said source of power in either direction, means arranged to operate the said clutch device to disconnect the drive to the said arm before the completion of each swing, a spring which is arranged to store at least the major part of the kinetic energy of the said arm and the said mass as strain energy in the spring when the said means arranged to disconnect the drive from the said source of power to the said arm has operated, the subsequent release of this strain energy of the said spring causing the said arm and the said mass to start the swing back in the reverse direction, and means arranged to reoperate the said clutch device after such a reversal to reconnect the drive to the said arm in the opposite direction.

2. A mechanism according to claim 1 wherein the said clutch device comprises first and second wheels arranged to be driven by the said source of power, and a third wheel arranged to drive the said arm, the arrangement being such that the said third wheel is driven by the first wheel for one direction of rotation of the said mass and by the second wheel for the other direction of rotation of the said mass.

3. A mechanism according to claim 2 wherein the drive from the first wheel to the third wheel and the drive from the second wheel to the third wheel is, in each case, transmitted by friction.

4. A mechanism according to claim 3 wherein means is provided to move the third wheel into frictional engagement with the first or second wheel.

5. A mechanism according to claim 4 wherein the means provided to move the third wheel comprises a piston connected with the third wheel, the piston being arranged to be actuated by oil pressure.

6. A mechanism according to claim 5 wherein the first, second and third wheels are co-axial, the third wheel being mounted between the first and second wheels.

7. A mechanism according to claim 1 wherein the arc of a circle in which the arm is arranged to swing lies in a horizontal plane.

8. A mechanism according to claim 1 wherein the arc of a circle in which the arm is arranged to swing is greater than 30° and less than 300°.

9. A mechanism according to claim 8 wherein the means arranged to disconnect the drive from the source of power to the arm operates when said arm is approximately 5° from the extreme position of swing and is moving towards that position, while the means arranged to reconnect the drive from the source of power to said arm operates when said arm is approximately 5° from the extreme position of swing and is moving away from that position.

10. A mechanism according to claim 1 wherein the spring which is arranged to store at least the major part of the kinetic energy of the arm and the mass is a torsion bar.

References Cited in the file of this patent

UNITED STATES PATENTS

| 1,518,879 | Spencer et al. | Dec. 9, 1924 |
| 1,801,715 | Bornstein | Apr. 21, 1931 |
| 2,169,089 | Davenport | Aug. 8, 1939 |
| 2,492,477 | Henly et al. | Dec. 27, 1949 |

FOREIGN PATENTS

| 697,932 | Germany | Oct. 28, 1940 |